Dec. 18, 1951 H. L. FISH 2,578,686

OPEN-SIDED-SOCKET RATCHET WRENCH

Filed April 27, 1945 10 Sheets-Sheet 1

HERBERT L. FISH,
INVENTOR.

BY Herbert A. Huebner
ATTORNEY.

HERBERT L. FISH,
INVENTOR.

BY
Herbert A. Huebner
ATTORNEY.

Dec. 18, 1951 H. L. FISH 2,578,686

OPEN-SIDED-SOCKET RATCHET WRENCH

Filed April 27, 1945 10 Sheets-Sheet 3

HERBERT L. FISH,
INVENTOR.

BY

Herbert A. Huebner
ATTORNEY.

INVENTOR.
HERBERT L. FISH,
BY
Herbert A. Huebner
ATTORNEY.

Dec. 18, 1951 H. L. FISH 2,578,686

OPEN-SIDED-SOCKET RATCHET WRENCH

Filed April 27, 1945 10 Sheets-Sheet 5

INVENTOR.
HERBERT L. FISH,
BY
Herbert A. Huebner
ATTORNEY.

Dec. 18, 1951 H. L. FISH 2,578,686

OPEN-SIDED-SOCKET RATCHET WRENCH

Filed April 27, 1945 10 Sheets-Sheet 6

INVENTOR.
HERBERT L. FISH,
BY
[signature]
ATTORNEY.

Dec. 18, 1951 H. L. FISH 2,578,686

OPEN-SIDED-SOCKET RATCHET WRENCH

Filed April 27, 1945 10 Sheets-Sheet 7

INVENTOR.
HERBERT L. FISH,
BY
Herbert A. Huebner
ATTORNEY.

INVENTOR.
HERBERT L. FISH,
BY
Herbert A. Huebner
ATTORNEY.

Dec. 18, 1951 H. L. FISH 2,578,686

OPEN-SIDED-SOCKET RATCHET WRENCH

Filed April 27, 1945 10 Sheets-Sheet 9

INVENTOR.
HERBERT L. FISH,
BY
Herbert A. Huebner
ATTORNEY.

OPEN-SIDED-SOCKET RATCHET WRENCH

INVENTOR.
HERBERT L. FISH,
BY
[signature]
ATTORNEY.

Patented Dec. 18, 1951

2,578,686

UNITED STATES PATENT OFFICE 2,578,686

OPEN-SIDED-SOCKET RATCHET WRENCH

Herbert L. Fish, Los Angeles, Calif., assignor, by mesne assignments, to Tubing Appliance Co., Inc., Los Angeles, Calif., a corporation of California Application April 27, 1945, Serial No. 590,577

12 Claims. (Cl. 81—61)

The present invention relates generally to wrenches and more particularly to wrenches for operatively turning threaded connecting devices for sections of pipe while the devices form elements of a conduit. Wrenches of this kind usually have been made with a slotted socket element revolubly mounted in a slotted end of a handle member and were revolved by some means such as a ratchet mechanism mounted in the handle.

Wrenches of the so-called "split socket" type need to be capable of withstanding hard service and severe strains at times. Also, they should be capable of turning a B nut or the like by a socket element that will not have a strong tendency to slip partly off the nut and "chew up," i. e. damage its outer surftce. As far as applicant is aware, none of the split socket wrenches heretofore proposed has reached a commercial status. Their designs were such as did not make for the economical manufacture of a strong and satisfactory wrench. Also, these wrenches had no means for holding their socket elements in fully operative engagement with the nuts on a continuous conduit, and the sockets could easily damage a nut. Moreover, each of these proposed prior split socket wrenches was suitable for use with but one size and shape, i. e. cross-sectional contour, of a threaded connecting device such as a B nut.

One object of my invention is to provide split socket wrench means which may be used satisfactorily for turning a plurality of B nuts or the like each of a different size or shape from the others.

Another object of my invention is the provision of a split socket wrench having means for assuring that there is no appreciable tendency for the socket element of the wrench to slip off a nut while turning it.

In the construction and maintenance of aircraft of various kinds, many B nuts and the like are used in the connections of pipes employed in hydraulic control mechanism and for other purposes. Many of such nuts, as will be well understood by those skilled in the art, cannot be operated satisfactorily by slit socket ratchet wrenches as heretofore constructed. The use of ordinary wrenches on such B nuts is slow and sometimes objectionable because of the little space often available for using such a wrench without danger of it striking and damaging some other parts of the aircraft which are often made of light materials not adapted to be struck forcibly by metal objects such as wrench handles.

Another object of my invention is to provide an improved wrench with which B nuts or the like in a continuous pipe system can be quickly and satisfactorily revolved.

It is often desirable in aircraft construction to place a plurality of continuous hydraulic control pipes as close to each other as is practical in order to conserve much valued space. Even with slit socket wrenches as heretofore constructed, a material amount of space adjacent a control pipe in an aircraft was often required for operating such a ratchet-drive slit socket on B nuts.

Another object of my invention is to provide a slit socket wrench with which B nut connections or the like in a continuous pipe system can be turned with the wrench stationary and requiring only a minimum amount of space during the turning operation.

Still another object of my invention is to provide an improved, slit socket ratchet wrench which is capable of withstanding severe strains and which is operable to turn B nuts and the like in either direction while they are elements of a continuous pipe system of large diameter.

An important object of my invention is the provision of a wrench for turning nuts and like devices which is operated by power while the handle of the wrench is held stationary.

Another object of my invention is to provide a power driven wrench for operatively turning threaded nuts which has a safeguard against stripping the threads of the nut.

A further object is to provide a wrench for turning nuts and the like by hand while the wrench is held stationary.

Another object is to provide a stationary wrench operated by hand power which can exert a powerful turning force on a nut or the like.

Still another object is the provision of a slit socket wrench of economical construction having a step-by-step nut turning movement without employing a relatively expensive ratchet wheel.

Another object of my invention is the provision of a ratchet-drive slit socket wrench which employs short pivotless pawl members of great strength, the capacity of which is not limited by pivot pin mountings for the pawls.

Other objects and advantages of my invention will appear as the description proceeds.

The present invention is a continuation-in-part of my now abandoned application for Letters Patent on improvements in Split Ratchet Socket Wrench for B Nuts, bearing Serial No. 531,325, and filing date of April 17, 1944.

Figure 1:
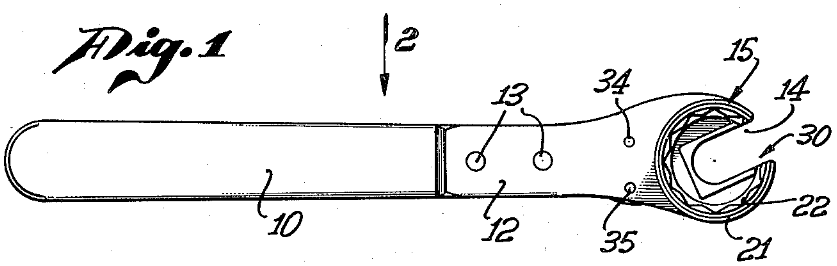
Figure 1 is a side view of a ratchet wrench constructed according to one form my invention may take.

Referring to the embodiment of my invention shown in Figure 1 which I may refer to as the number one form, 10 is a metal handle of a shape commonly used in similar wrenches. Fastened securely to each side of the handle 10 is jaw 11 and jaw 12. These jaws may be spaced apart the thickness of the handle or any distance desirable and fastened to the handle by screws 13 or other suitable fastening means. The outer end of each jaw is enlarged and is made with a slot or gap element 14. The inner portion of each slot 14 has the form of a portion or segment of a circle. The width of the slot opening at the outer extremity of the circular portion is less than the diameter of the circular portion of the gap for an advantage presently to appear. 15 represents generally a revoluble B nut-engaging unit having two journal elements 16 and 17 which are made to engage with a snug working fit in the circular portions of the slots 14 in the jaws 11 and 12 and are flush with the sides of the jaws. The journal elements 16 and 17 are integrally joined and spaced apart so as to engage with jaws 11 and 12 respectively. Integrally joined to the element 17 is an inner sleeve portion 18 extending downwardly as viewed in Figure 4. Fastened on the sleeve 18 by a screw 20 is a socket 21 which may have the approximate outer form of a cylinder. In the walls of this cylindrical member 21 are internal spline-like teeth 22 constructed for engagement with the B nuts for which the wrench is designed to be used. Between the teeth 22 and the sleeve 18 is provided a space 23 for receiving portions 24 of the B nuts extending beyond the usual nut body 25. A space 26 is provided between the inner ends of the teeth 22 and the space 23 to permit forming of the teeth. The inner end of the member 21 is made with a knurled portion 27 for conveniently rotating the unit 15 by the user's hand when such is desirable. The entire unit 15 functions as a ratchet driven socket.

To enable the unit 15 to be placed in position over a pipe P having a B nut connection with another pipe or part, a slot-like opening 30 is provided through the walls of the bearing elements 16 and 17 and the sleeve 18 and the cylindrical member 21. This opening is slightly wider than the diameter of the pipe P.

Figures 2, 3, 4, 5:
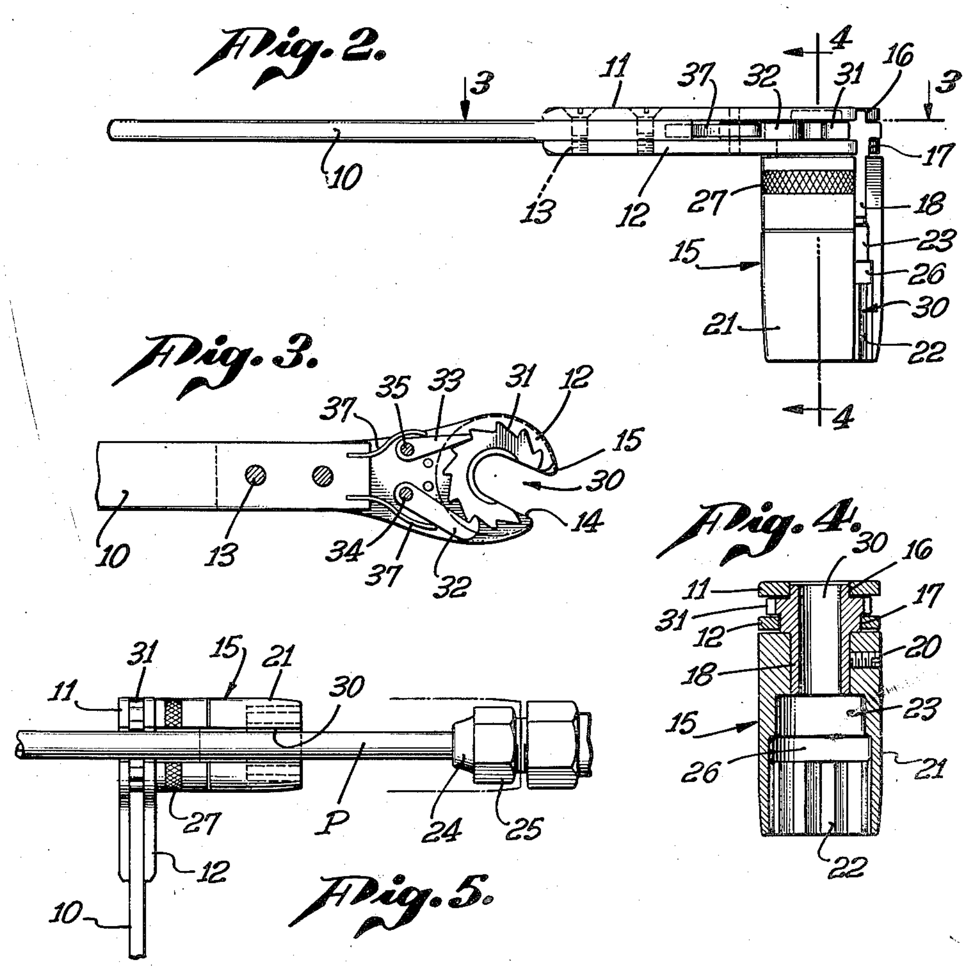
Figure 2 is a view taken at right angles to the plane of the ratchet handle of Figure 1.
Figure 3 is a view of structure similar to that shown in Figure 1 being broken away in part to show certain details of construction more clearly as seen on line 3—3 of Figure 2.
Figure 4 is a longitudinal sectional view of a slotted head element taken along the lines 4—4 of Figure 2.
Figure 5 is a side view of a wrench embodying my invention and illustrates how it may be placed in position on a pipe preparatory for lateral movement into engagement with a B nut.
Figure 6:
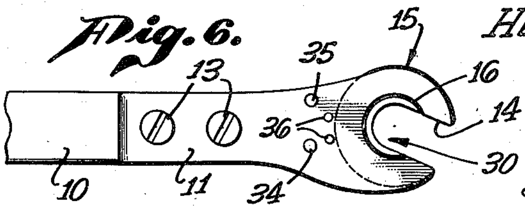
Figure 6 is a partial side view of the structure of Figure 2 looking in the direction of the arrows on line 3—3.
Figure 7:
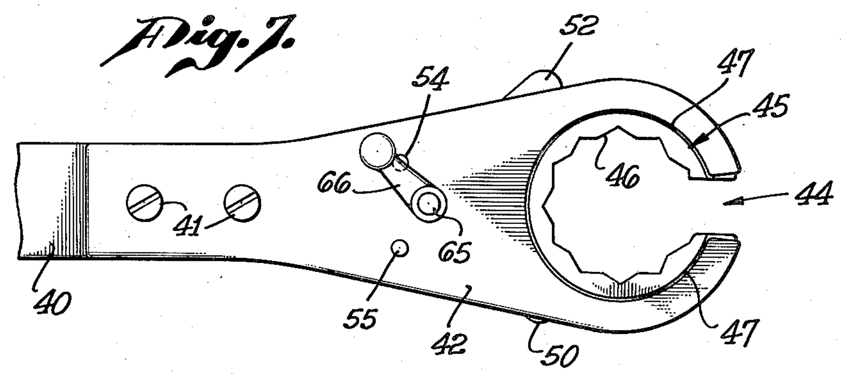
Figure 7 is a partial side view of another form of wrench that my invention may take.
Figure 8:
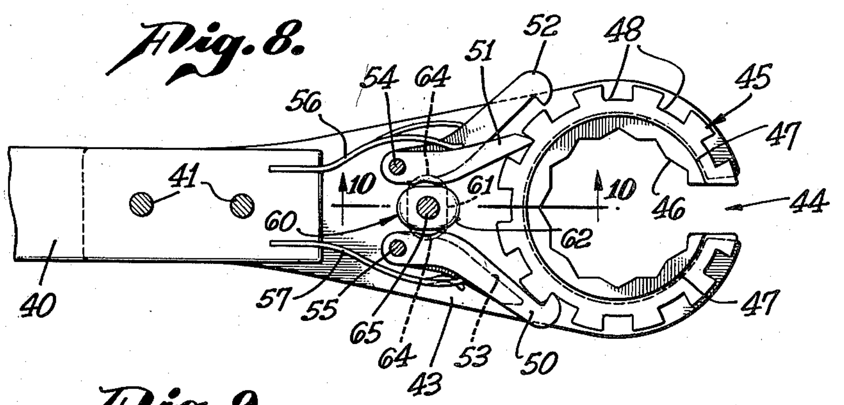
Figure 8 is a side view of the structure of Figure 7 broken away in part to show certain details of construction as seen on line 8—8 of Figure 9.
Figure 9:
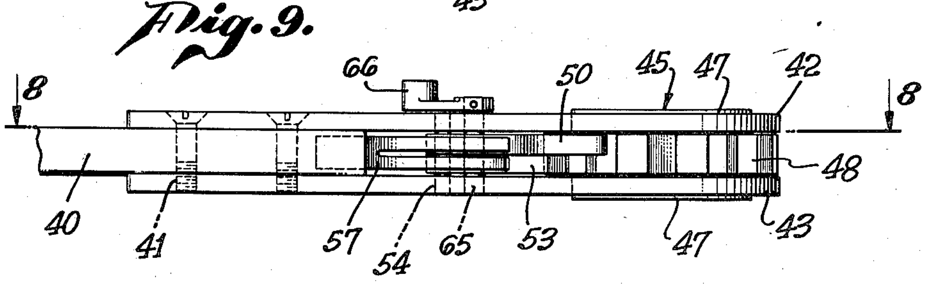
Figure 9 is a view of the structure of Figure 7 taken at right angles to the plane of that structure's handle.
Figure 10:
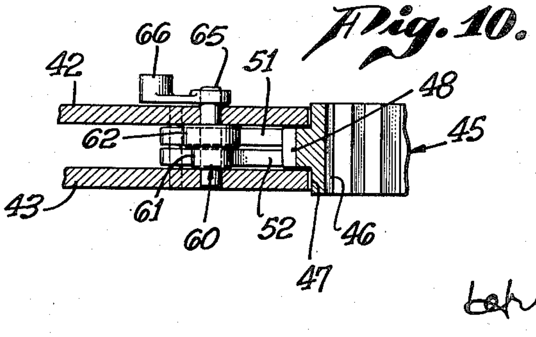
Figure 10 is a partial cross-section through the structure of Figure 8 along the line 10—10.

To revolve the unit 15 and the B nut 25 in engagement with it in one direction, an advantageous ratchet means may be provided as follows: Ratchet teeth 31 having a thickness to fit snugly between the jaws 11 and 12 are cut in the solid stock btween the elements 16 and 17. The outside diameter of these teeth exceeds the diameter of the circular portion of the gaps 14. In the space between the jaws 11 and 12 and between the inner end (right end as viewed in Figure 3) there are mounted two spring pressed pawls 32 and 33 pivoted on strong pins 34 and 35, respectively, which extend between the jaws 11 and 12 and which also help to stiffen the jaws against sidewise motion under strain. The pawl 32 is made in the form of a drive or pull pawl and the pawl 33 is made as a dog or push pull but both pawls serve as drive pawls. The ends of the pawls are positioned so that when the end of one of the pawls is disposed in the slot 30 the end of the other pawl is in engagement with the teeth 31 at some point and are effective to rotate the wrench unit 15. Pins 36 are positioned for stopping the pawls 32 and 33 in position for assembling the pawls and ratchet teeth. Wire springs 37 may be mounted as shown in Figure 3 to press the pawls into engagement with the teeth. The pins 36 also serve to prevent the springs 37 pressing either pawl down too far into the slot 14 when the latter is revolved past the end of either pawl.

It can be seen from inspection of Figures 1, 4 and 5 that the socket unit 15 is provided with a desirable bearing means which maintains it and its unit engaging teeth 22 in true parallel relation to a pipe P having a B nut 25 to be turned. This parallel relation is secured by constructing the sleeve 18 with an inside diameter for engaging snugly about the pipe with which it is to be used, and to have the sleeve extend from the nut engaging portion of the unit 15 to an integral juncture with the slotted ratchet element 17. Maintaining the teeth 22 in parallel relation to the faces and edges of the nut 25 while the latter is being turned is important since it reduces to an inappreciable amount any tendency for the teeth to become disposed at an angle to the faces and edges of the nut which if it occurred would probably result in the nut being "chewed up" i. e. roughened and marred, and also help make the socket 15 become disengaged from the nut.

In Figures 7 to 10, inclusive, there is illustrated another form which my invention may take which is different from the above described number one form in construction and operation in certain ways to be pointed out hereinafter. A handle 40 similar to handle 10, except that it is preferably thicker, may be fastened by screws 41 between jaws 42 and 43. These jaws are each formed with a slot or gap element 44, the inner portion of the gap having the form of a segment of a circle. The distance between the jaw portions at the outer end of the circular portion of the gap 44 is less than the diameter of the circular portion of the gap. For engaging a B nut, a collar 45 may have internal teeth-like elements 46 and two external circular bearing elements 47 constructed for engaging with a snug working fit in the circular portions of the gaps 44 in the jaws 42 and 43 and be flush with the sides of the jaws. A gap or opening is provided in the collar 45 of aproximately the same width as the gap 44. In the external surface of the collar 45 between the bearing elements 47 are provided ratchet teeth 48, the outer diameter of the teeth being greater than the diameter of the bearing elements 47 and they fit snugly between the jaws 42 and 43. These teeth 48 are designed to permit the collar to be revolved in either direction as may be convenient, for example for operating on B nuts having right-hand threads or left-hand threads. For revolving the nut engaging collar 45 in either direction, the following described means may be employed: A set of two right-hand pawls 50 and 51 for revolving the collar 45 in a clockwise direction (as viewed in Figure 8) are pivoted in the space between the jaws 42 and 43 at the end of the handle 41. The pawls 50 and 51 are positioned so that their free ends engage the teeth 48 far enough apart as to always leave one of the pair of 50, 51 pawls in engagement with some of the teeth 48 when the free end of the other pawl of the pair is disposed in the gap in the pawl teeth which coincides with the gap in collar 45. Another pair of pawls 52 and 53 are pivoted alongside the pawls 50 and 51 for revolving the collar 45 counterclockwise when such operation is desirable. The pawls 51 and 52 are preferably mounted on the same pin 54 fastened in the jaws 42 and 43, and the pawls 50 and 53 are preferably mounted on the same pin 55. For pressing the pawls 51 and 52 into engagement with the teeth 48 a single leaf spring 56 which has one end portion fastened in the handle 41 has the other end portion split and formed suitably for engaging the associated pawls. In like manner, a single split leaf spring 57 may be employed for pressing the pawls 50 and 53 against the teeth 48. For holding one of the pairs of the pawls described above inoperative while the other pair is in use, a revoluble cam unit 60 may be mounted between the pawls pivoted on the pin 54 and the pawls pivoted on the pin 55. This cam unit 60 has two integrally joined cams 61 and 62 so disposed that when the cam 61 is in a position transverse to the long axis of the wrench handle, it moves the pawls 52 and 53 outwardly to an inoperative position. A small round detent notch 64 in each of the pawls 52 and 53 engage with the opposite ends of the cam 61 and holds it securely in its operative position and the pawls 52 and 53 in their inoperative positions. The construction and operation of the cam 62 and the pawls 50 and 51 are similar to that of the cam 63 and its associated pawls. The cam unit 60 is mounted on a short shaft 65 which projects slightly beyond the jaw 42 and has fastened to it a short handle 66 for operating the cams 61 and 62. It will be noted that the collar 48 is held securely in position in the wrench by means similar to that described for holding the nut engaging unit 15 in the number one wrench form of my invention.

It will be readily understood that the number one form of my invention may be used to revolve a B nut or the like in the direction desired for the work to be done. That is to say, the particular form illustrated in Figures 1 to 5 may be made either right-hand or left-hand, depending upon which direction from the handle the engaging unit 15 extends. As shown, the wrench is a right-hand one, and to be left-hand, the unit 15 would be inverted. Moreover, this form could be made reversible in the same manner as the form shown in Figures 7 to 10 by incorporating in the first form a dual ratchet mechanism similar to that of the second form. Also the right-hand form illustrated in Figures 1 to 6 may serve as a left-hand wrench by turning the nut engaging unit 15 over (to the left) and operating the handle upwardly for revolving ratchet teeth 31.

Figure 11:
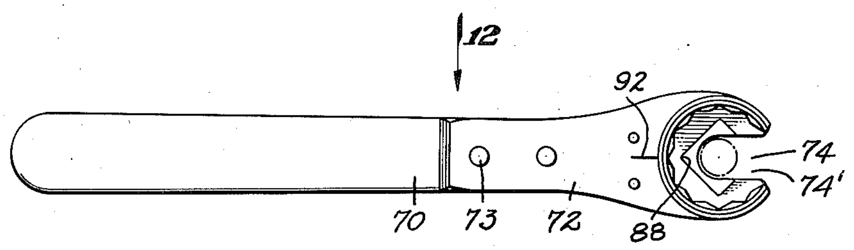
Figure 11 is a side view of another form of ratchet wrench which embodies my invention.
Figures 12, 13, 14:
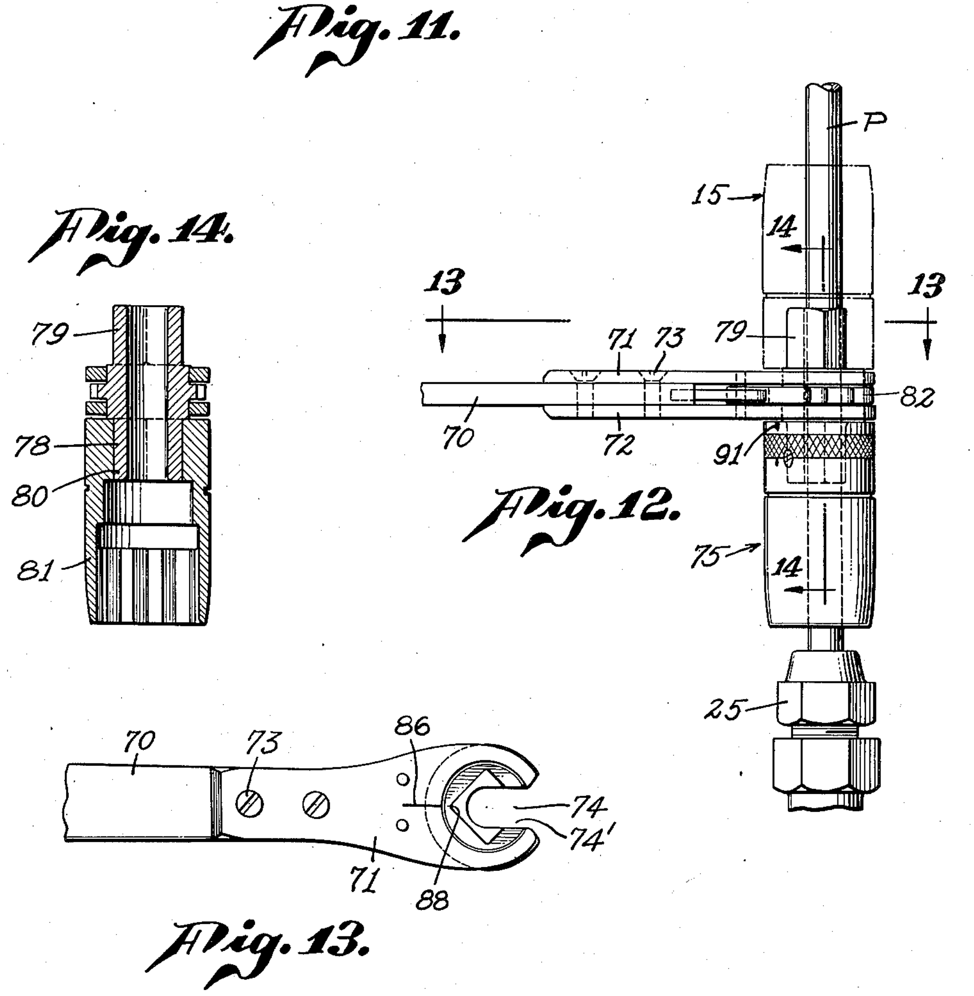
Figure 12 is a partial side view of the wrench of Figure 11 illustrating it fastened on a pipe system ready to be moved laterally into engagement with a B nut.
Figure 13 is a partial side view of the Figure 11 wrench looking at the opposite side from the view of Figure 11.
Figure 14 is a longitudinal sectional view of the wrench structure of Figure 12 taken along line 14—14.

In Figures 11, 12 and 13 another form my wrench may take is illustrated, which has certain desirable features presently to appear. On each side of a handle 70 two jaw members 71 and 72 are fastened by screws 73. The enlarged end head portion of the jaws 71 and 72 are symmetrical and their axes align with the long axis of the handle instead of being shaped as the jaws shown in Figure 1. Jaws 71 and 72 may have a slot 74 similar in construction and function to the slot 14. A nut engaging socket unit 75 may be driven by ratchet mechanism and this unit 75 and its ratchet mechanism may be the same in construction and function as similar parts 15 etc. of the above described number one form of my wrench except as is pointed out hereinafter.

The unit 75 is preferably made with sleeve member 78 which has one end portion 79 extending out a short distance from the jaw 71 (see Figures 12 and 14) instead of stopping flush with that jaw as in the construction shown in Figure 1. The end portion 79 and another like end portion 80 preferably have a square or hexagonal cross section in part instead of a round cross section. This square form affords several advantages. A nut engaging socket member 81 of the unit 75 can have a very strong connection with the stock of the ratchet teeth 82. Also the protruding sleeve portion 79 can be used conveniently to revolve the unit 75 to bring a slot 74′ therein into alignment with the slot 74. This may be convenient when, for example, the wrench is fastened on a continuous pipe system by these slots being out of alignment due to the use of the wrench for tightening up a B nut connection, and to use the wrench elsewhere it must be removed from engagement with the pipe system by having the slots in alignment. Also the square form of sleeve provides a compact means for turning the unit 75 slightly relative to the handle 70 for bringing teeth 82 in the socket into proper engagement with a B nut or the like while the wrench is being moved laterally into engagement with the B nut with the other hand of the user. Furthermore, by providing a mark 86 on the jaw 71, this mark will cooperate with the middle edge 88 of the projecting sleeve portion 79 and thus indicate that the slots 74 and 80 are in alignment and the wrench may be removed from engagement with a continuous pipe system. To this same slot aligning indicating end, a line 91 on the member 81 may cooperate with a line 92 on the jaw 72.

The ratchet wrench in Figure 12 may be moved along the pipe P to the right into engagement with a B nut 25, or it may be turned over 180° around the long axis of the handle 70, and with the unit 75 disposed as indicated in dot and dash outline the wrench may be removed to the left for engaging a B nut or the like, not shown. In this position one hand of the user may press the unit 75 against the nut while the fingers of the other hand turn the unit 75 slightly.

When the unit 15 or unit 75 is at the right of its respective handle, as viewed in Figures 2 and 12, a nut is turned, i. e. the wrench is operated by upward movement of the handle. When the units are at the left of their handles the wrench is operated by a downward movement of the handles.

It will be understood that the term continuous pipe system as used in the specification and claims of the present application is intended to mean a line of pipes and other parts associated with fluids which extend between and/or form a continuous conduit between any devices used with fluids, whether liquids or vapors. Furthermore, a pipe system having a stretch of considerable length between a B nut and part or connection or the like and an end unconnected to anything is in effect a substantial continuous pipe system as regards the difficulty of employing a usual ratchet wrench to turn B nuts or the like on the pipe system when such nuts are a long way from the open or unconnected end.

It can be seen that all forms of my wrench are fastened securely on a pipe system by their engagement with the nut and the movement of the slots in the nut-engaging members out of alignment with the slot in the wrench head, the movement of the slots being done first in many cases.

As is well known, the term Parker fitting is sometimes applied to B nuts which as shown in Figures 5 and 12 are compression coupling members for joining soft metal tubing.

In Figures 15 to 21, inclusive, there is illustrated another form my invention may take which shows a ratchet driven split socket wrench of strong construction. A knurled handle 100 of a body 101 is made with an enlarged head portion 102 which is formed with a cavity 101C preferably of a shape as shown in Figures 16A, 16, 17 and 21, and as is further described hereinafter. A cover plate element 103 of the head 102 may be integral with the body 101. Another cover plate element 104 of the head may be a member fastened strongly to the head by screws 105. The outer ends of the cover plate elements 103 and 104 may have made therein aligned slots or gaps 106 of equal width, the inner portions of which are enlarged and have the forms of portions or segments 107 of a circle, one concentric with the other. To secure advantages presently to appear, the circular segment in the plate 104 is larger in diameter than the circular segment in the plate 103. The diameter of the segments 107 exceed the width of the slots 106. For securing an extra strong mounting in the head 102 of a socket carrying member 108 presently to be described the plate 103 is formed with an inturned integral flange-like member 109 (see Figure 16). The external perimeter of this flange is circular in form, and at the forward side, the flange has a slot element that can be brought into alignment with the slots 106. The inner portion of the slot 115 has a circular enlarged form corresponding to and concentric with the circular segments 107.

The socket carrying member 108 has an inner tubular portion 110 with an inside diameter and a length such that it will fit snugly around the flange 109 in the cavity 101C in the head 102 and provide a strong, revoluble mounting for the member 108 that will keep it in perpendicular relation to the plane of the body 101.

It is to be noted that there is a rearwardly disposed portion 111 of the cavity 101C which is not filled by the tubular portion 110. An outer tubular portion 112 of the member 108 is integrally joined to an end wall element 113 which is also integrally joined to the tubular portion 110. The juncture of the portion 112 and the wall element 113 is arranged to leave an annular offset or shelf element 114 which abuts snugly against the cover plate 104, and braces the member 108. The above disclosed arrangement of the socket carrying member 108 and the associated handle parts provides an exceptionally strong and firm mounting for the member 108 while leaving it easily revoluble by means presently to be described.

In the member 108 there is made a longitudinal slot element 115 of the same width as the slot 106 and the inner end of the slot is preferably a tangential semi-circular form concentric with the circular segments 107 in the plate 103 and 104. The diameter of the semi-circular slot end and the width of the slot 115 is approximately the same as the outside diameter of a pipe or conduit having thereon a B nut 25 to be screwed on or off by the wrench shown in Figure 15 for an advantage to appear hereinafter. In accordance with that feature of my invention which is to make one split socket wrench capable of satisfactorily engaging and turning a plurality of B nuts of different sizes and shapes, i. e. cross-sectional contours, the following described construction of sockets to be releasably mountable on a wrench according to my invention is advantageous. One form of a socket member 120 may have an outer tubular socket portion 121 made with spline-like teeth elements as in Figure 18, for example 122 for engaging the B nut across the inner end of the tubular socket portion 121 is an integral wall element 123. Extending inwardly (upwardly as viewed in Figure 16) is an integral tubular sleeve-like element 124 which may have an inner cylindrical form of a diameter to fit snugly around the outer end portion 112 of the member 108. A lengthwise slot 115′ of the same size and shape as the slot 115 is provided through wall portions of the socket elements 121 and 124. It is to be noted that this slot 115′ is also made in the wall element 123 and in this element the slot has a semi-circular end concentric with the inner end of the slot 115 and approximately the same diameter as the outside diameter of a pipe P with which the socket is to be used. This construction keeps the teeth 122 securely in parallel relation to the edges of a B nut which for reasons pointed out hereinbefore is very desirable while the nut is being turned.

Figures 15, 16, 16A, 17, 18, 19, 20:
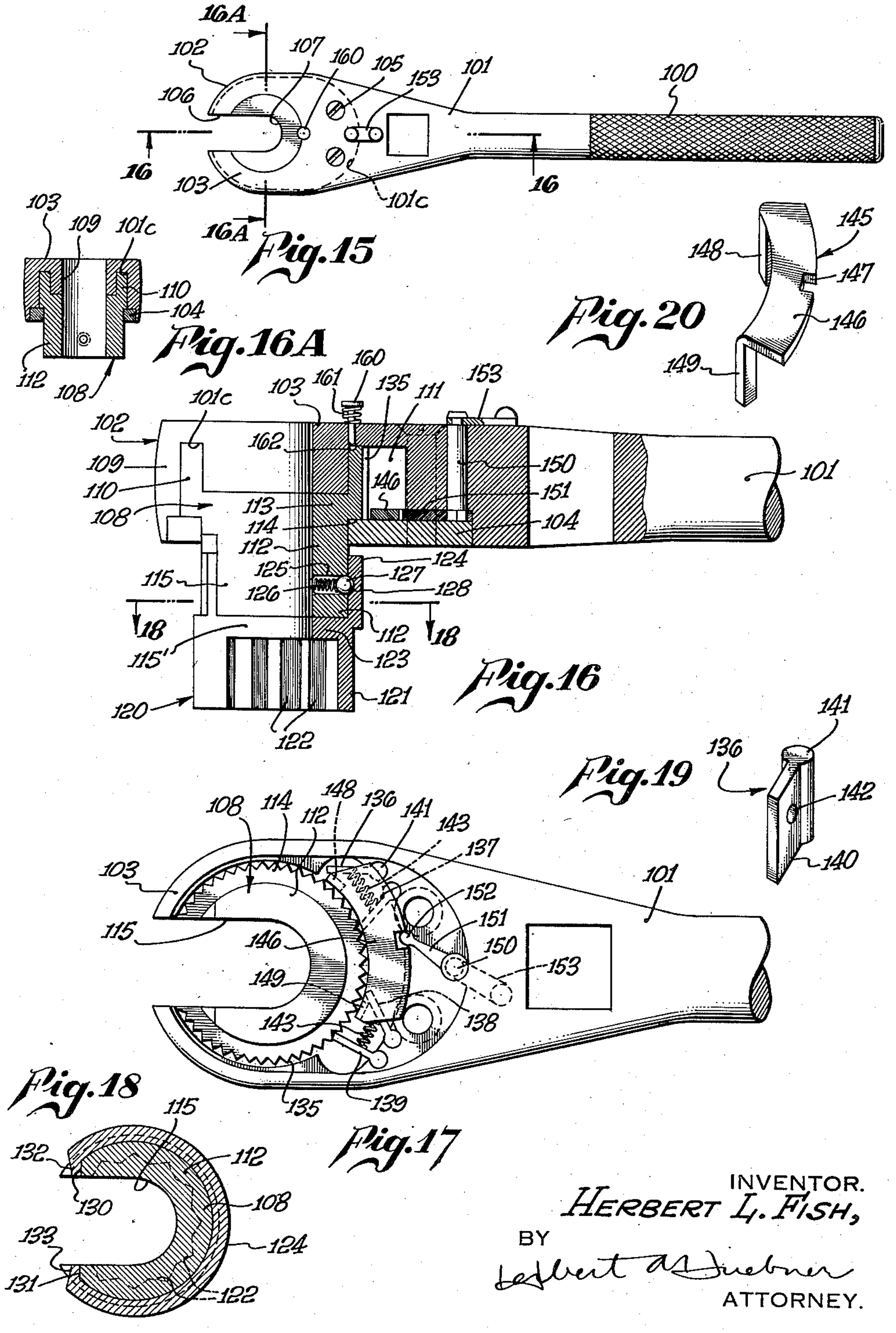
Figure 15 is a side view of a form of wrench which embodies my invention and which has a different ratchet drive mechanism from the wrench shown in Figure 3.
Figure 16 is an enlarged bottom view broken away in part of the structure of Figure 15 (as seen along line 16—16 of Fig. 15).
Figure 16A is a cross-sectional view along the line 16A—16A of Figure 15.
Figure 17 is an enlarged view of the structure of Figure 15 shown with a side cover plate removed.
Figure 18 is a cross-sectional view along the line 18—18 of Figure 16 in the direction of the arrows.
Figure 19 is a perspective view of an advantageous design of pawl used in the structure of Figure 17.
Figure 20 is a perspective view of a part used as an element of the structure of Figure 17.
Figure 21:
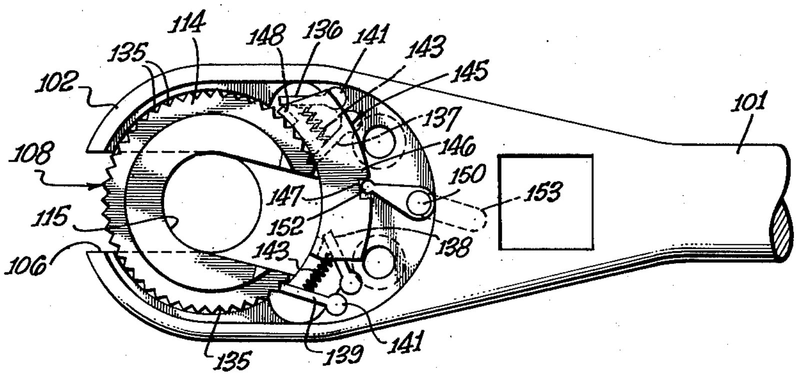
Figure 21 is a view similar to Figure 17 and illustrates how the structure of Figure 17 operates to turn a B nut through a full revolution.
Figures 22, 23:
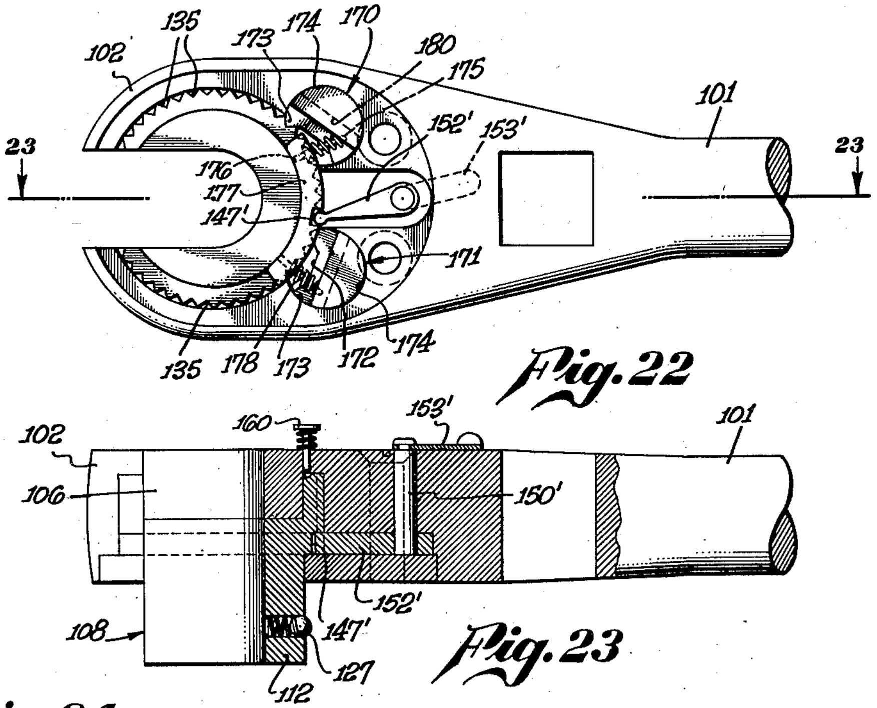
Figure 22 is a side view broken away in part of a form of wrench embodying my invention which has a different ratchet drive mechanism from that of Figure 3 or 17.
Figure 23 is a bottom view broken away in part of the structure of Figure 23 (taken on line 23—23 of Figure 22).
Figure 24:
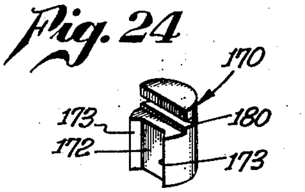
Figure 24 is a perspective view of a part used in the structure of Figure 22.
Figure 25:
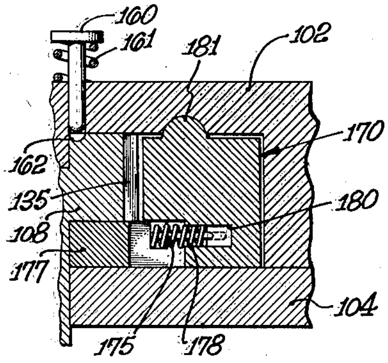
Figures 25 and 26 illustrate advantageous construction and arrangement of certain parts of the structure of Figure 22, as will appear hereinafter.
Figure 26:
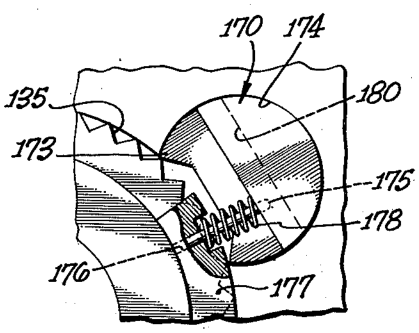

For holding the socket member 120 securely on the member 108 but in a way that it can be readily removed therefrom by simply pulling on it, in a hole 125 which extends only partly through a wall element of the tubular portion 112 is mounted a small coiled spring 126 and a metal ball 127. The hole 125 is made in a well known way so that the ball 127 may be yieldingly pushed only part way out of the wall. For a detent coaction with the ball a shallow recess 128 is provided in the wall of the tubular element 124. To assure that the socket 120 turns with the member 108 on which it is mounted cooperative spline-like means of well known construction (not shown) may be provided in the elements 112 if desired and 124. However, according to another feature of my invention a less expensive construction for securing this end is shown in Figures 16 and 18. By this construction, the periphery of the tubular element 112 and the adjacent inner surface of the element 124 are circular. At the outer end of the slot 115 through the wall of the element 112, portions of the wall are squared off at each side of the slot as shown at 130 and 131. Adjacent portions 132 and 133 of the sleeve element 124 are turned inwardly to be disposed closely against the squared off portions of the tubular element 112. This construction also makes it impossible to assemble the slotted socket member 120 on the slotted member 108 with the slots in two parts out of alignment which is an advantage of importance in some cases in aircraft and ships where there is but little light for workmen to use wrenches.

For driving the socket carrying member 108 in either direction for turning B nuts and the like, ratchet teeth 135 as shown in Figure 17 may be cut in the tubular element 110. For engaging these teeth, two sets of two pawls each may be provided and are designated 136, 137, 138 and 139. Each of these pawls may be of the same size and shape as the others. Each pawl has a body 140 and an enlarged journal end 141 of circular periphery as illustrated in Figure 19. The pawls 136 and 137 (one set) have their journal ends set in circular bearing elements recessed in the wall at the rear of the cavity in the body 101. In like manner, the pawls 138 and 139 are mounted in the cavity in the body at a distance greater than the width of the slot 115. Each pawl in a set is made with a small circular recess 142 in its side that faces the other pawl of its set. These recesses serve for mounting a small pull spring 143 fastened to and disposed between the two pawls of a set for a purpose presently to appear.

As viewed in Figure 17, the pawls are arranged for driving the socket 120 (Figure 16) clockwise by the pawls 137 and 139 as the handle 100 is oscillated. While this is being done, the pawls 136 and 138 are held in inoperative positions by the following described means. A shift yoke device 145 has an arcuate base element 146 with a notch 147 intermediate its ends and two pawl shifting lugs 148 and 149, one such lug extending out at approximately right angles to the plane of the base 146 which fits snugly in a section of the cavity in the body 101 adjacent the cover plate 104. The lug 148 comes between the pawls 136 and 137 and the lug 149 comes between the pawls 138 and 139. When the yoke 145 is shifted counter-clockwise (Figure 17) by a device hereinafter described the pair of pawls 136 and 138 are swung to inoperative positions and held there clear of the ratchet teeth 135. In this position, the springs 143 pull the pawls 137 and 139 positively into engagement with the teeth 135. When the yoke 145 is shifted clockwise the pawls 137 and 139 are swung out of engagement with the ratchet teeth 135 and the pawls 136 and 138 are pulled by the springs 143 into engagement with the ratchet teeth for driving the socket 120 counter-clockwise. For shifting the yoke 145, a stub shaft 150 may be mounted in the body 101 and have one end extending inwardly to the plane of the body 146. To this inner end, may be pasted a shift arm or lever 151 having an outer rounded end element 152 disposed in the notch 147. To the outer end of the stub shaft may be fastened a shift lever 153. It will be noted by inspection of Figure 21, that when one of a pair of the operative driving pawls is opposite the slot 115, the other pawl of the operative pair is in engagement with the teeth 135. Also, one of the lugs 148 or 149 will also function to hold the idle pawl opposite the slot 115 from being pulled into the slot by its associated spring. It can be seen that the construction and arrangement of the pawl drive for the form of my invention illustrated in Figures 15 to 21, inclusive, provides a reversible, inexpensive and durable pawl drive that is especially strong because of eliminating a pivot pin mounting for the pawls which has usually been found heretofore in similar wrenches. When a split socket ratchet wrench is being used in many places it is difficult for the user to see when the slots, such as the slots 106 and 115 in Figure 15 are in alignment so that the wrench can be removed from a continuous conduit or pipe system. To solve this problem a headed pin 160 may be mounted for slidable movement in a hole through the side plate 103 and is normally pressed outwardly by a coil spring 161 so that the lower end of the pin does not normally project beyond the inner face of the side plate. A shallow recess 162 is made in the sleeve 110 opposite the center of slot 115 and passes under the pin as the sleeve revolves. The pin 160 is positioned opposite the slot 106. By pressing lightly on the pin with one hand of the user as the other hand oscillates the wrench or revolves the socket directly, engagement of the pin 160 in the recess 162 will stop the turning of the sleeve 110 with the slots 106 and 115 in alignment.

An advantageous form my invention may take is illustrated in Figures 22 to 26, inclusive. In this Figure 22 form, as it may be called, all of the parts except the ratchet drive as is described hereinafter may be of the same construction as the parts described hereinabove in connection with the form illustrated in Figures 15 to 21, inclusive. In the Figure 22 form, instead of employing two sets of pawls for the ratchet drive, two pawl devices are used; each having the same form and construction. They comprise stub shaft oscillatable members 170 and 171, each having a forwardly disposed face 172 and at each side of this face is provided a tooth member 173 strongly and integrally joined to the shaft. Each of the shafts 170 and 171 may be seated in a mounting hole 174, having a round inclosing wall element except opposite the hollowed out face 172. For pressing one tooth of each of the shafts 170 and 171 into operative driving engagement with the teeth 135, a pin 175 for each shaft has its inner end portion disposed in a hole 176 provided in an arcuate slidable ring member 177 (Figure 25) lying against the side plate 104 and extending partly below (as viewed in Figure 25) the shafts 170 and 171. A compression spring 178 around each pin 175 presses it against a bottom of a groove element 180 across each shaft (see Figure 24). For reversing the direction of the drive of the Figure 22 form of my invention, substantially the same yoke shift means may be employed as are described hereinbefore for use with the Figure 15 form of my invention. A knob 152' on lever 153' engages in a notch 147' provided in the ring 177. A round integral knob-like element 181 on each of the shafts 170 and 171 may be positioned coaxial therewith and fit snugly in a cooperative recess provided in the side plate 102 to serve as a pivot for pawl carrying stub shafts.

Figures 27, 28, 29, 30:
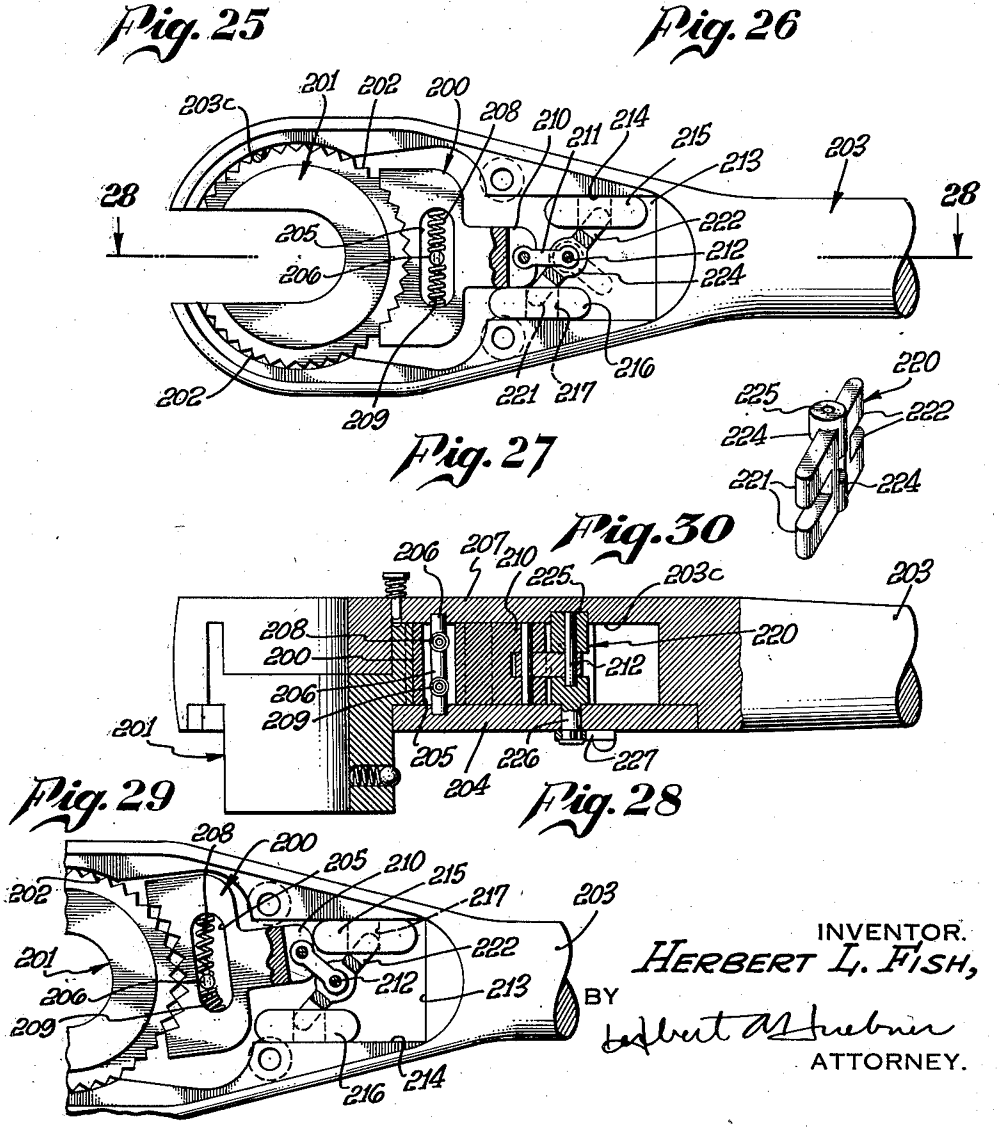
Figure 27 is a side view broken away in part of a form of wrench which embodies my invention and which has one shoe pawl for rotating the socket element of the wrench step-by-step which has certain advantages that will appear hereinafter.
Figure 28 is a bottom view, broken away in part, of the structure of Figure 27 taken on line 28—28 of Figure 27.
Figure 29 is an operational view of the structure of Figure 27.
Figure 30 is a perspective view of a part forming an element of the structure of Figure 27.

In Figures 27 to 30, inclusive, there is illustrated a form my invention may take wherein only one pawl device, a toothed shoe 200, is employed for driving a slotted rotatable socket carrying member 201 which may be of substantially the same construction as the member 110 and have similar ratchet teeth 202. A wrench handle may have a body 203 arranged with a suitable cavity 203C for having bearing elements for mounting the rotatable member 201. The cavity in the body 203 will be of a slightly different form and size, as is described hereinafter, from that in the body 101 as is illustrated in Figures 27 and 28. To correspond with the cavity in the body 203 a cover plate 204 is provided which is slightly different from the plate 104. For driving the member 201 in either direction by the single shoe 200, the latter may be provided with an elongated crosswise hole 205 therethrough and centrally positioned in this hole is a strong pin 206 having its ends fastened, one in an integral cover plate element 207 and the other in the plate 204. Two sets of compression springs 208 and 209 of suitable stiffness may be mounted in the hole 205. One end of each spring in a set bears against the pin 206 and the other end against an adjacent end wall element around the hole 205. The shoe 200 has a rearward slotted projection 210 in the slot of which is pivotally fastened, one end of a rearwardly extending stiff link or strut 211. The other end of this link is pivoted to a pin 212 disposed between the cover-plates 204 and 207 in a way presently to appear.

For cooperation with the shoe 200 to hold the teeth thereof in operative driving engagement with the teeth 202, the cavity in the body 203 has a rear portion 213 with side walls 214 arranged in parallelism with the sides of the shoe rear extension 210 and spaced therefrom a distance equal to the width of a stop block 215 of which there is a like stop block 216 on the opposite side of the extension 210. Each of the stop blocks 215 and 216 may be made as illustrated in Figures 27, 28 and 29 preferably with ends having a semi-circular convex shape. Each of the blocks 215 and 216 is made with a centrally disposed, cross-wise hole 217 therethrough for a purpose soon to appear. A drive shift control member 220 may be constructed as illustrated in Figure 30 and have two sets of parallel fingers 221 and 222 formed with rounded outer end elements, their inner ends being integrally joined to a central hub member 224 which has a middle portion cut away for receiving the rear end of the link 211 which is pivotally fastened to the pin 212 seated in an axial bore extending partly through the hub 224. At the upper end of this hub (as viewed in Figure 28) is a stub journal 225 projecting into the cover plate 207 and at the lower end is a stub journal 226 projecting through the cover plate 204 to have fastened thereon a shift lever 227. The ends of the fingers 221, 222 are disposed in the holes 217 in the stop blocks 215 and 216 and either of the latter may be selectively moved to operative position by operation of the lever 227. The step by step driving operation of the shoe 200 can be seen from an inspection of Figures 27, 28 and 29. In the last named figure, the shoe 200 is shown as the handle is being ratcheted i. e. swung backward for beginning another step advance of the socket carrying member 201.

Figure 31:
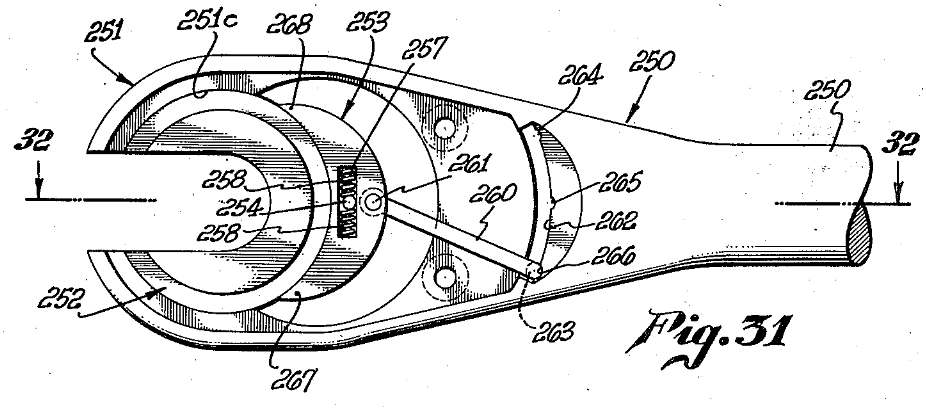
Figure 31 is a side view broken away in part of a form of wrench which embodies my invention and which has a step-by-step drive for the socket element of the wrench that requires no teeth for the driven revoluble part connected with the socket.
Figures 32, 33, 33A:
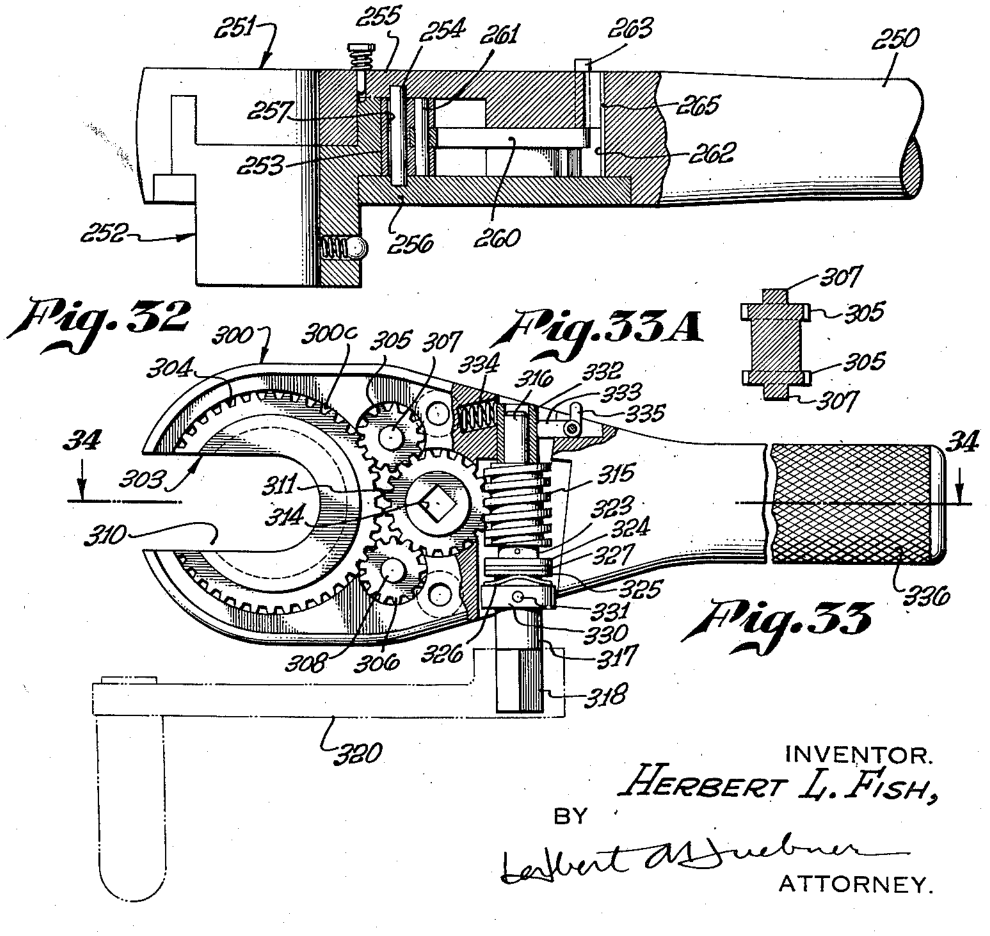
Figure 32 is a bottom view broken away in part of the structure of Figure 31 taken on line 32—32 of Figure 31.
Figure 33 is a side view broken away in part of a form of wrench which embodies my invention and which employs a worm drive for the socket element of the wrench that enables the wrench handle to be held stationary while the socket is being revolved.
Figure 33A is a detail of one of the gears in Figure 33.

In Figures 31 and 32 there is illustrated a form my invention may take which is less expensive to manufacture than such a form, for example, as is shown in Figures 15 and 16. Also this Figure 31 or friction drive form which employs a step-by-step drive operates in a quieter manner than most step-by-step drives which have ratchet teeth with pawl devices that are swung backwardly to be dragged over the ratchet teeth.

A handle 250 may have a slotted body 251 arranged with a cavity 251C and have means for mounting in the body a slotted rotatable socket carrying member 252 which may be of the same construction as the socket carrying member 110 except as is explained hereinafter. No ratchet teeth or other similar devices are made on the periphery of the member 252 which may be made as a smooth cylindrical surface. In the portion of the cavity 251C at the rear of the member 252 is placed a one-piece driving shoe 253 having a crescent-like shape as is shown in Figure 31. This shoe is held in position for turning the member 252 step-by-step by the following described means. A strong pin 254 having one end journalled in a hole in an integral upper (as viewed in Figure 32) cover plate 255 and a lower cover plate 256 is disposed in a narrow rectangular hole 257 through the shoe 253 and one or more strong compression springs 258 are mounted on each side of the pin 254 in the hole 257 with one end of each spring bearing against the pin and the other end bearing against the wall element at the adjacent end of the hole.

For cooperation with the shoe 253 in two advantageous ways, presently to appear, a strong shift and drive bar member 260 has one end pivotally fastened to a pin 261 fastened in the shoe 253 adjacent and parallel to the pin 254. The other end of the bar 260 extends rearwardly to circular slot 262 in the upper portion of body 251 above (as viewed in Figure 32) and a pin 263 in the bar 260 extends outwardly through the slot 262. In the wall at the rear of the slot are provided three shallow notches 264, 265 and 266 for selectively receiving and retaining therein the pin 263. As shown in Figure 31 the bar 260 is in notch 266 and the shoe 253 is thus ready to rotate the member 252 clockwise step-by-step. Initial oscillating driving movement of the handle causes the bar 260 to have a toggle-like function and to exert a pushing action against the shoe 253 in a way that greatly increases the pressure of an arm or tip element 267 of the shoe against the curved periphery of the member 252. When the bar is swung to move the pin 263 to the notch 264, and the handle 250 is swung counter-clockwise, greatly increased pressure of an arm element 268 against the member 252 results for turning the latter clockwise. Upon return or backward swinging movement of the handle 250 in either direction, the angular disposition of the bar 262 provides for only a light frictional engagement of the shoe arms and the member 252. When the pin 263 is left in the middle or neutral notch, being held there by action of the spring 258, only a light pressure of the shoe arms 267 and 268 against the member 252 results.

Figure 34:
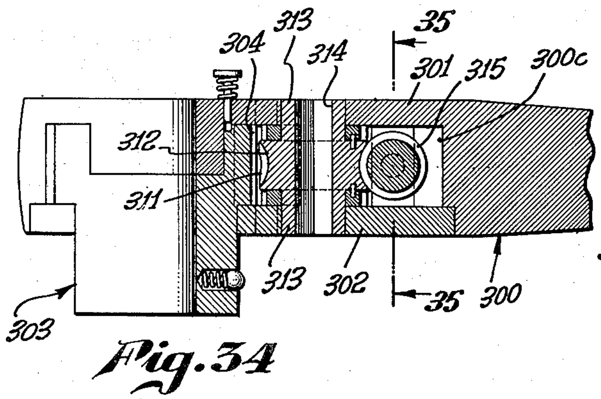
Figure 34 is a bottom view broken away in part of the structure of Figure 33 taken on line 34—34 of Figure 33.
Figure 35:
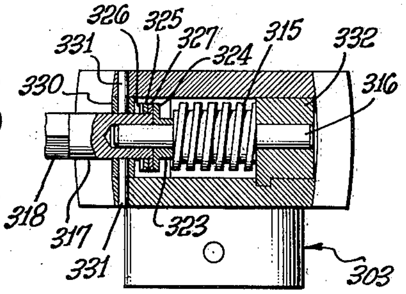
Figure 35 is a side view broken away in part of a slip clutch for worm mechanism which forms an element of the structure of Figure 34 as seen on line 35—35 of Figure 34.

To attain that object of my invention which is the provision of a split socket wrench with which B-nuts in a line of pipe may be turned without oscillating the wrench handle whatever, a form of my invention illustrated in Figures 33 to 35, inclusive, may be employed. A slotted body portion 300 of this form of wrench may have an integral cover plate element 301 and removable cover plate element 302 which cover plate elements may be of like construction, except as is hereinafter described, as the cover plates 103 and 104. Between the cover plates 301 and 302 is a cavity 300c in which is rotatably mounted a slotted socket carrying member 303 which may be of the same construction as the socket carrying member 108 except as will be presently explained. In the entire peripheral curved surface of the member 303 are cut spur gear teeth 304.

To mesh with these teeth, are mounted two spur gears 305 and 306 on shafts 307 and 308 suitably journaled in the cover plates 301 and 302 and spaced apart a distance exceeding the width of a slot 310 in the member 303. Mounted for operative engagement with both of the gears 305 and 306 is a drive gear 311, which preferably includes a body element 312 in which the teeth are cut, and two coaxial integral stub shaft elements 313, one at each end of the body. These stub shafts are journaled in holes in the cover plate 301 and 302. Extending through the stub shafts 313 and the body 312 coaxial therewith is a square hole 314 for receiving a squared end of a suitable crank arm tool (not shown) of well known construction for turning the gear 311 speedily when such is desired.

To enable a large size of socket (not shown) in the member 304 to be turned against heavy resistance of a rusted B nut, for example, the following described means may be provided: A worm 315 having threads for cooperative driving engagement with the gear 311 may be mounted loosely in the cavity on a shaft 316 having an end portion extending out from the body 300 on which may be mounted loosely a hollow shaft extension 317 having a squared end portion 318 for having attached thereto a hand crank device 320 of well known construction. The extension 317 may be held on the shaft 316 by any suitable means of well known construction. For transmitting power from the crank 320 to the worm 315 the latter may have an integral stub shaft extension 323 to the outer end of which is an integral flange 324. Between a flange 325 on the inner end of the shaft extension 317 and the flange 324 may be disposed a friction drive device of well known construction which may include a spring member 326 and a suitable frictional power transmitting disc 327.

To enable the worm 315 to be rendered ineffective to prevent speedy operation of the socket carrying member the lower end (as viewed in Figure 33) of the worm may be pivoted to be swung away from the gear 311 by the following means. A collar member 330 secured on the shaft extension 317 is pivoted on two pins 331 journaled in the cover plates 301 and 302. The right end (as viewed in Figure 35) of the shaft 316 is mounted in a movable block member 332 disposed snugly between the cover plates 301 and 302 and is held firmly in a position to dispose the worm 315 in cooperative driving relation to the gear 311 by a bell crank control member 333 which holds the gear in operative position against the action of a spring 334. An arm 335 of the bell crank member extends outwardly of the body 300 to be operated manually. To limit the swinging movement of the worm 315 by the spring 334 and the block 332 the rear end of the cavity 300*c* may be constructed as shown in Figure 33.

It can be seen that by making the hand crank device 320 and a handle 336 of suitable lengths, one in relation to the other that a person can conveniently hold the handle of the wrench body stationary with one hand while he operates the wrench with the other hand.

Figure 36:
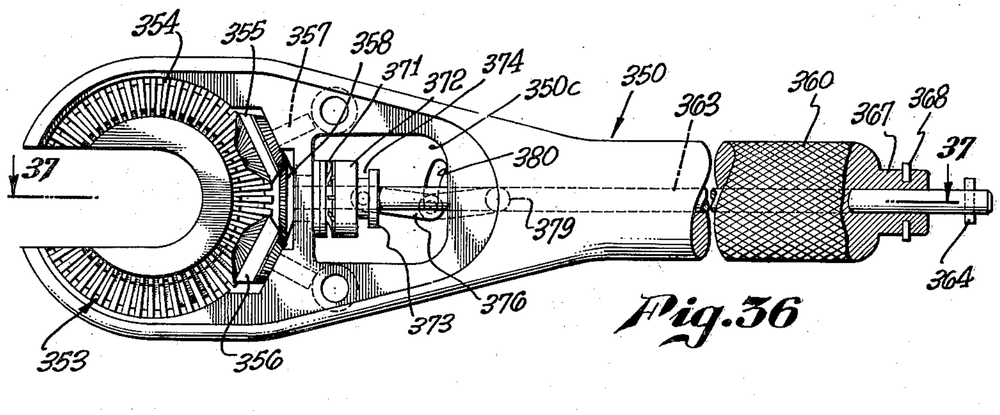
Figure 36 is a side view partly diagrammatic and partly broken away of a form of wrench which embodies my invention and which has a gear drive for the socket element of the wrench that enables the handle of the wrench to be held stationary while the socket is being revolved by power.
Figure 37:
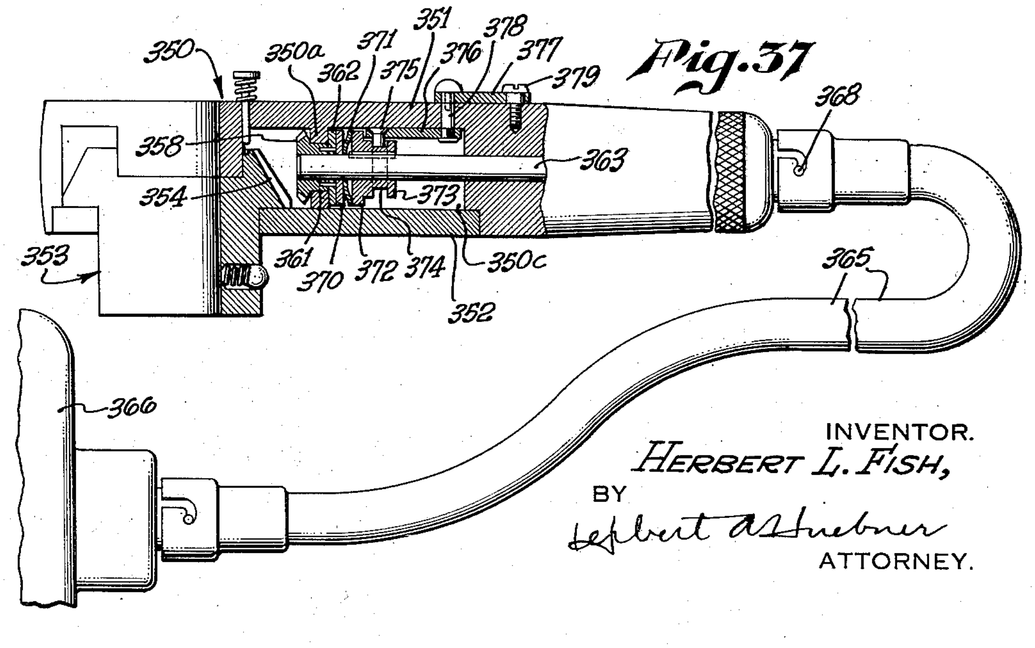
Figure 37 is a bottom view broken away in part of the structure of Figure 36 as seen on line 37—37 of Figure 36.

To accomplish that object of my invention which is the provision of a power driven split socket wrench, an embodiment of my invention as is illustrated in Figures 36 and 37 may be employed. A slotted wrench body 350 may have an integral cover plate portion 351 and a removable cover plate 352 enclosing a cavity 350*c* in which may be mounted a slotted rotatable socket carrying member 353 which may be of the same construction and mounting except as is hereinafter described, as the socket carrying member 303. Bevel gear teeth 354 are cut in all of the curved periphery of the member 353. Two bevel gear members 355 and 356 are each mounted on pintles 357 fast in the body 350 between the cover plates 351 and 352 so that gear teeth on the forward sides of these gear members mesh with the gear teeth 354 on the member 353 In the rear faces of the gear members 355 and 356 are cut bevel gear teeth with which mesh bevel gear teeth in a drive gear 358, the axis of which coincides with the long axis of a handle 360 integrally joined to the body 350. The gear 358 is integrally joined to a hollow stub shaft 361 the rear end of which projects rearwardly from an integral wall elements 350*a* of the body 350 in the cavity 350*c*. An apertured flange member 362 is pinned to the rear end of the shaft 361. The latter and the flange 362 are mounted loosely on the forward end of a shaft 363 which extends rearwardly through a lengthwise hole in the handle 360 and projects outwardly from the end of the handle. The projecting portion of the shaft 363 has a pin 364 therethrough for a connection of well known construction with a flexible shaft 365 which may be driven by an electric motor 366 or other suitable prime mover. An outer end portion 367 of the handle 360 is reduced in diameter and arranged with pin members 368 for cooperation in a well known way with the flexible shaft connection. Should a B nut (not shown) being turned by the motor driven wrench of Figure 37 be screwed up fast to the end of its travel, an excessive strain might result in the threads of the B nut, for example, if substantially the full power of the motor 366 has to be resisted by the threads at the moment they stop their operative turning movement. To prevent excessive strains in such an event on the B nut threads any any part of the wrench, I provide a slip clutch device between the shaft 363 and the gear 358. A friction disc 370 of well known construction is pressed against the flange 362 by a slip clutch spring member 371 of well known construction.

The spring 371 is ordinarily forced against the disc 370 by a collar 372 integrally joined to a sleeve 373 having a keyed slidable mounting on the shaft 363 to be rotatable therewith and movable lengthwise thereon. For pressing the collar 372 up against the spring 371, the sleeve 373 is made for receiving a shaft yoke member 374 of well known construction in which is fastened a pin 375.

Fastened loosely about the pin 375 is the forward end of one strut or leg 376 of a toggle-like device having another strut 377, one end of which is pivotally fastened to the rear end of the strut 376 by a pivot pin 378 which extends outwardly through an arcuate slot 380. The strut 377 is positioned against the outside face of the integral cover plate 351. The rear end of the strut 377 is pivoted about a screw 379 in the body 350. As can be seen by inspection of Figures 36 and 37 this construction provides a positive so-called broken-back toggle lock for maintaining the slip clutch means of the Figure 36 form of wrench in operative condition.

To release the connection between the motor 366 and the socket carrying member 353 for turning the latter manually, it is only necessary to press on the head of the pin 378 and swing the toggle upwardly (as viewed in Figure 36).

Figure 38:
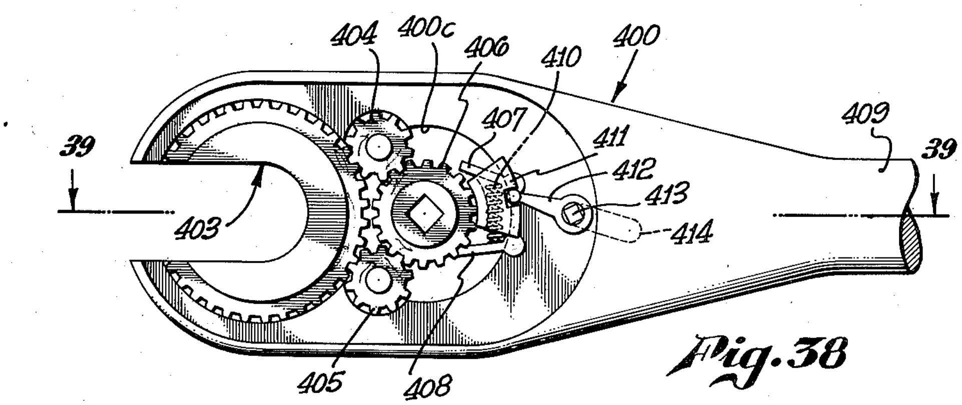
Figure 38 is a side view, broken away in part, of a form of wrench which embodies my invention and which employs gears for engagement with the socket element of the wrench and which employs a ratchet mechanism for driving the gears.
Figure 39:
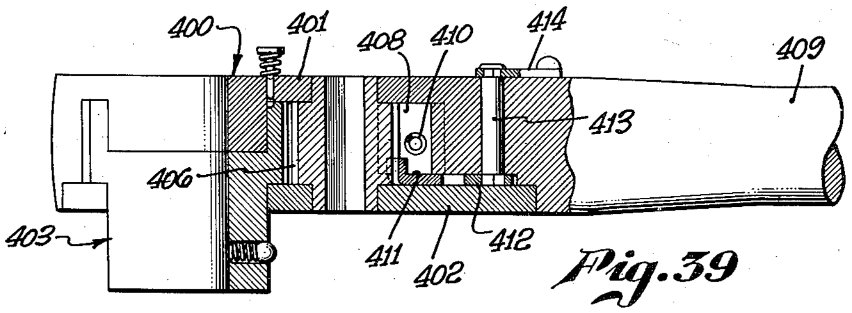
Figure 39 is a bottom view, broken away in part, of the structure of Figure 38 as seen on line 39—39 of Figure 38.

In Figures 38 and 39 there is illustrated a form my invention may take which has certain advantageous features presently to appear. In this form, the construction of a slotted body 400 with an integral cover plate 401 and a removable cover plate 402, a slotted, toothed socket carrying member 403, and spaced apart spur gears 404 and 405 may be the same as disclosed hereinbefore for similar parts which enter into the construction of the Figure 33 form of my invention, except for a slight change in the form of the body 400 to be explained hereinafter.

For driving the spur gears 404 and 405, a gear 406 may be provided which has gear teeth which mesh with the teeth of the spur gears and which are drivenly engaged by two pawls 407 and 408 which may be of substantially the same construction and have a pinless mounting in a wall of a cavity 400*c* of approximately the same construction as is disclosed hereinbefore for the pawls of the Figure 17 form of my invention except as will presently appear. The pawls 407 and 408 are each mounted on opposite sides of the center line of the wrench and wrench handle 409. A pull spring 410 having one end fastened to one pawl and the other end to the opposite pawl, tends to move the pawls into operative engagement with the teeth of the gear 406.

To provide for only one pawl at a time to engage with the gear 406, a shift yoke device 411 may be provided and be of approximately the same operation and construction except to be narrower as the shift yoke 145 of the Figure 17 form of my invention. For selectively moving the yoke 411, a lever device including a lever 412, a shaft 413 and another lever 414 outside the cavity 400c may be provided and be of substantially the same construction and operation as the lever 151, the shaft 150 and the lever 153, respectively, of the Figure 17 form of my invention.

The gear 406 may be of approximately the same construction and mounting as the gear 311 and have a square axially positioned through it for receiving a speed wrench tool (not shown) of well known construction for operating the wrench when, for example, it is inconvenient to operate it by oscillating the handle 409 and rotating the socket carrying member 403 step by step.

Figure 40:
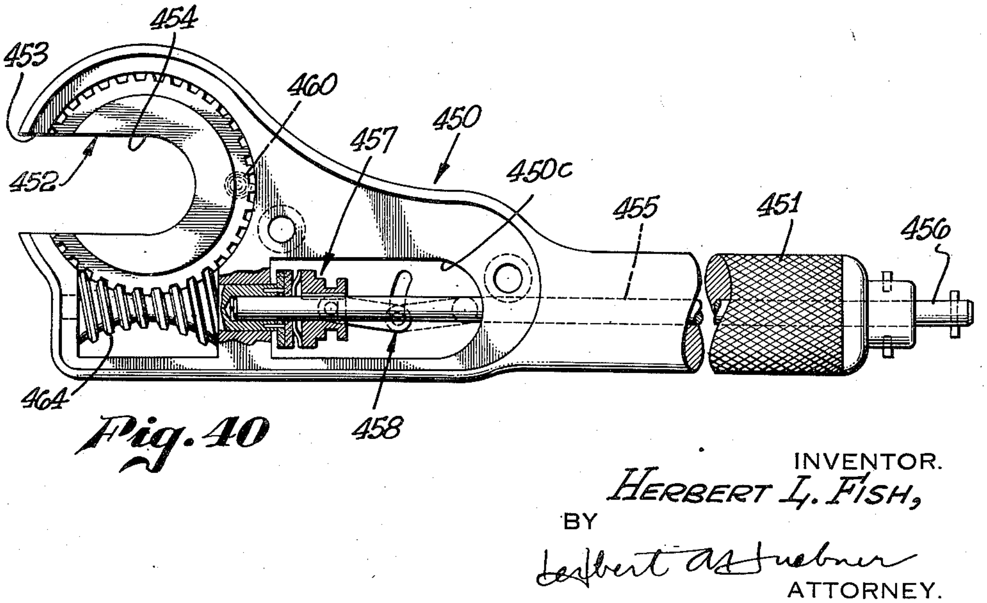
Figure 40 is a side view, broken away in part, of a form of wrench which embodies my invention and which employs a worm gear drive for the socket element of the wrench that enables the wrench to be held stationary while the socket is being revolved by power applied to the worm of the drive.

In Figure 40, there is illustrated a form of wrench which embodies my invention and which is especially suitable for use where an extra strong torque force is required, for example to start a nut that is "frozen," i. e. stuck very tightly on a pipe because of rust or other causes. In this form of wrench, a body 450 may have mounted thereon at one side of the center line of a handle 451 a socket carrying rotatable member 452. The mounting of the member 452 may be substantially the same in construction as is described hereinbefore for the member 110 of the Figure 17 form of my invention except as is explained hereinafter. The body 450 may have a slot 453 at its forward side and the member may have a slot 454 of equal width made for aligning with the slot 453. In the curved portion of the member 452 are provided gear teeth constructed for operative driven engagement by a worm 454 mounted at the side of the member 452 with its axis in coaxial relation to a shaft 455 mounted in the handle 451 and having one end portion 456 extend outwardly from the rear end of the handle for a connection (not illustrated) with a source of power. The shaft end portion 456 and the adjacent end portion of the handle 451 may be of the same construction as similar parts of the Figure 37 form of wrench described hereinabove. As a safeguard against stripping the threads of a B nut or the like when turning it by power applied through the worm 464, this worm may be driven through a slip clutch or friction drive device generally designated in Figure 40 as 457 and being of substantially the same construction as the slip clutch drive described hereinbefore in connection with the form of my invention shown in Figures 36 and 37. Also, the slip clutch drive device 457 may be rendered inoperative by a manually operable toggle control device generally designated as 458 which may be of substantially the same construction and operated like the toggle device shown in connection with the wrench illustrated in Figures 36 and 37. The slip clutch device 457 and the toggle device 458 are disposed in a rearwardly positioned chamber of a cavity 450c in the body 450 which cavity chamber may be enclosed by a cover plate (not shown) fastened by screws to the body.

A device for stopping the rotation of the socket carrying member when the slots 453 and 454 are in alignment and such is desirable, a stop pin device generally designated as 460 may be of the same construction and operated like the pin 160 shown as an element of the wrench illustrated in Figure 16.

Figures 41, 42:
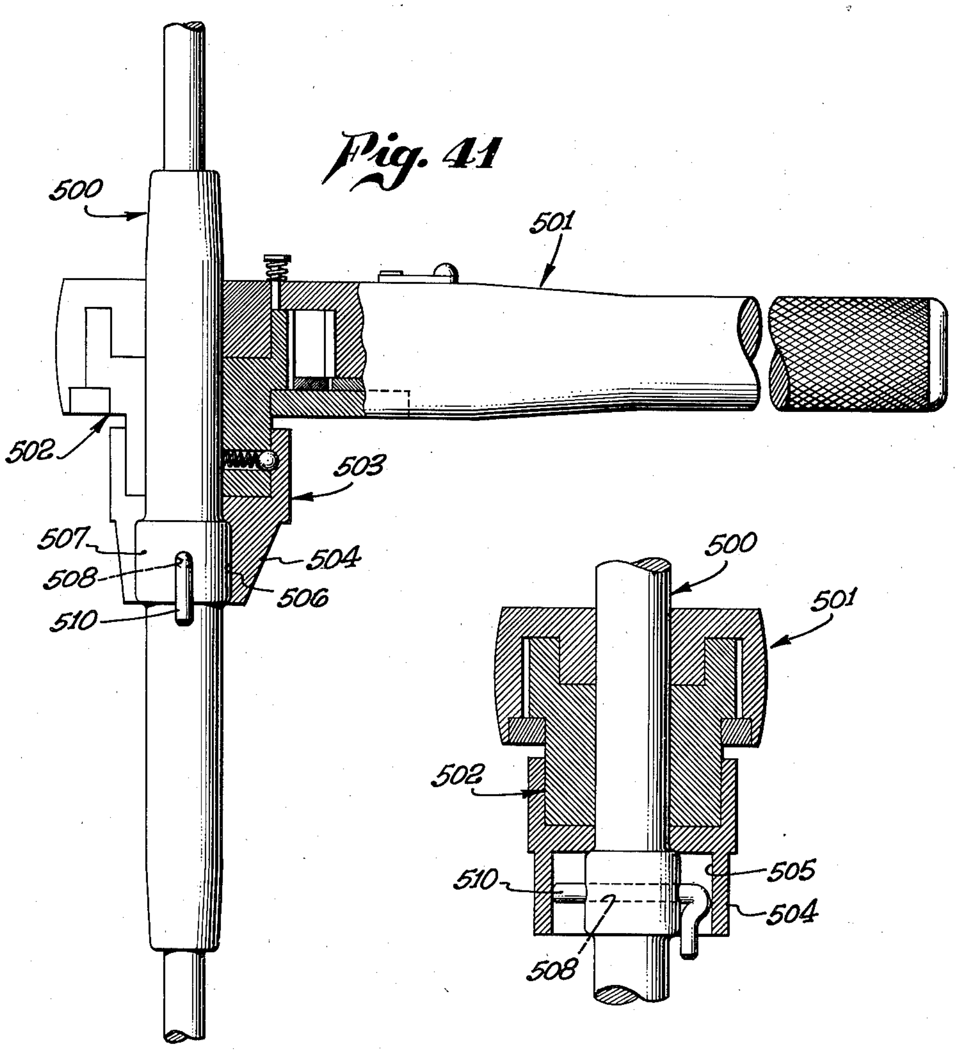
Figure 41 is a top view, broken away in part, showing a wrench which embodies my invention arranged for operating a turnbuckle.
Figure 42 shows a detail of construction of the socket of Figure 41.
Figure 43:
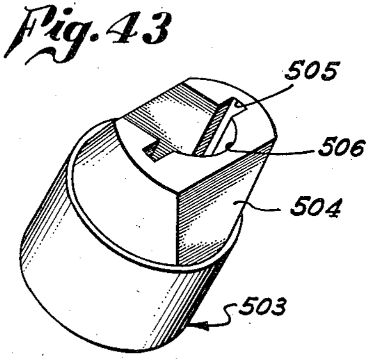
Figure 43 shows a form of socket member advantageously used with the structure of Figure 41.

In Figures 41, 42, and 43, there is illustrated an embodiment of my invention which will effect the operative rotation of a turnbuckle 500 of a well known construction while the turnbuckle is an element of a continuous line of bracing rods or of similar structural elements of aircraft or ships. A wrench generally designated as 501 may be of the same construction and operation as the form of my wrench invention illustrated in Figures 15 to 21 inclusive. On a socket carrying element 502 of the wrench there may be mounted a socket 503 the inner end portion of which may have the same construction and operation as the inner (upper as viewed in Figure 16) end portion of the socket 124. As illustrated in Figure 43, an outer end portion 504 of the socket device 503 may be made with a shallow lengthwise slot element 505 on each side of a centrally disposed axial hole 506 which is made to fit snugly around a usual centrally disposed integral collar-like element 507 of the turnbuckle 500. Through slot 508 of usual construction in the collar, a stiff locking pin 510 is inserted. At one end of this pin a portion 511 is bent back along the pin and then transversely thereto. This construction helps to prevent the pin from slipping so far through the collar 507 that one end of it (the pin) may project too far outward to go into the associated slot 505. As shown in Figure 42 the pin may be seated securely in the socket end portion 504 and cannot be removed therefrom until the socket and wrench are moved away from the pin along the turnbuckle.

Although I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent devices.

Having thus described my invention, what I claim and desire to secure by Letters Patent is:

1. A split socket wrench for turning B nuts on a pipe comprising a handle having a circular aperture in one end portion perpendicular to the longitudinal axis of the handle, said end portion being formed with a lengthwise open slot communicating with said aperture, a socket driving member coaxial with said aperture and mounted for rotation on said end portion, drive means on the handle for rotating the socket driving member, a nut engaging socket member having a detachable and non-rotary connection with the socket driving member coaxially therewith, said socket driving member and socket member each having a slot extending the length thereof and one aligned with the other, said last two slots aligning with the first named slot in one rotational position of the driving member, all of said slots having a width approximately equal to the diameter of said pipe, and alignable indicia carried by the handle and said socket driving member respectively in a manner to indicate to the user the corresponding alignment of said slots whereby said wrench is in a condition to be removed from engagement with said pipe.

2. A split socket wrench for turning a B nut element of a pipe including a handle having an end formed with an aperture perpendicular to the longitudinal axis of the handle and an open slot communicating with the aperture, a tubular socket-carrying member revolvably and drivably mounted in the aperture coaxially therewith, a longitudinally extending slot inlet through a wall of said member and alignable with the slot in said handle for engaging said member about the pipe, an interchangeable socket for engaging said B nut having a substantially crescent-shaped shank portion including a terminal abutment, said shank being releasably and telescopically mounted on said socket-carrying member and having a co-axial substantially crescent-shaped complementary nut-engaging portion extending axially from the shank, said nut-engaging portion and said shank portion having a continuous lengthwise slot for the reception of said pipe and alignable with said slot inlet and the slot in said handle, said socket-carrying member having a transversely formed abutment adjacent its slot adapted for axially slideable engagement with said terminal abutment to drive said socket rotatably.

3. The structure described in claim 2, said slot inlet comprising a guide means for disposing said socket in coaxial relation to said B nut when said wrench is engaged on said pipe.

4. The structure described in claim 2 having guide means engageable with the pipe adjacent the B nut for disposing said socket in coaxial relation to said B nut, said last named means including circular wall elements of the same form and diameter as that of said pipe, and normally bearing thereagainst and turning slideably therearound when said wrench is in engagement with said pipe.

5. A wrench comprising a handle, a revoluble socket carrying member having an axial bore with a lengthwise slot through the wall around said bore, a journal mounting means for said member on one end of said handle, said mounting means being slotted longitudinally on the side opposite said handle, means carried by said handle for operatively turning said revoluble member, a socket-like member coaxial with said revoluble member and having a lengthwise slot therein, and abutment means on said revoluble member and socket member respectively and cooperating for fastening said socket member firmly on said revoluble member with the slots in said socket member and said revoluble member in alignment, said abutment means being readily releasable whereby any one of a plurality of sizes of said socket member may be alternatively employed as an element of said wrench.

6. The structure described in claim 5 characterized by said abutment means including transverse faces in said socket carrying member and a hook-like formation adjoining the outer end of each side of the slot in said socket member for cooperation with said transverse faces.

7. The structure described in claim 5 characterized by said abutment means including transverse shoulders in one of said members and a cooperative hook-like shoulder adjoining each side of the slot in the other of said members, the remaining portion of said members which engage one another being corresponding surfaces of concentric cylinders.

8. A socket wrench comprising a body, a hub rotatable in said body and formed with an open slot, a replaceable nut-engaging member operatively associated with said hub and formed with a slot alignable with the slot in the hub, gripping means co-acting between said body and said hub whereby said hub may be forcibly rotated, said hub and said body each having circumferentially arcuate interfitting axially disposed flanges and grooves formed therein for slideable rotative guiding movement during relative rotation of the hub and body, longitudinally extending shoulders on the hub at the outer edge of the slot in the hub, respectively, and a slotted, collar-like axially disposed shank on the nut-engaging member telescopically engaging said hub, said shank having longitudinally extending hook-like means adjacent the slot in the shank, said hook-like means slidably engaging said shoulders when said shank is engaged with the hub to form a driving connection between the nut engaging member and hub.

9. A socket wrench comprising a body, a hub rotatable in said body and formed with an open slot, a replaceable nut-engaging member operatively associated with said hub and formed with a slot alignable with the slot in the hub, gripping means co-acting between said body and said hub whereby said hub may be forcibly rotated, said hub and said body each having circumferentially arcuate interfitting axially disposed flanges and grooves of greater depth than width formed therein for slideable rotative guiding movement during relative rotation of the hub and body, at least one longitudinally extending shoulder formed on the hub at the outer edge of the slot in the hub and a slotted, collar-like axially disposed shank on the nut-engaging axially slideable into engagement with the hub, said shank having longitudinally extending and inwardly projecting hook-like means adjacent at least one outer extremity of the slot in said shank, said hook-like means being complementary to said shoulder and nesting the same when said shank is engaged with the hub.

10. In an open end ratchet wrench, a driving head having a circular opening therein and an axial slot extending outwardly from the opening to the periphery of the head, a driven member mounted for rotation in the head coaxially with the opening, a circular coaxial flange extending from one end of said member, a circular extension on the opposite end of said member forming a radial shoulder thereon, said head having a circular groove coaxial with the axis of rotation of the head nesting said flange, a plate secured to the head and engaging said shoulder, said plate having an opening receiving said extension and a side opening slot aligned with the slot in the head, said driven member having a side opening slot extending the length thereof and through said flange and extension and registering with the first named slots in one rotative position of said member, and ratchet means forming a driving connection between the head and driven member.

11. A wrench according to claim 5 in which the means for turning the revoluble member comprise circumferential ratchet teeth thereon, a pair of pawl means carried by the head and relatively spaced circumferentially of the head, each pawl means having a pair of opposed ratchet tooth engaging members respectively for driving the revoluble member, and manually operable shifting means common to both pawl means and having operative connections therewith to simultaneously move the same to selectively bring corresponding tooth engaging members of both pawl means into operative engagement with said ratchet teeth.

12. A socket wrench comprising a body, a hub rotatable in said body and formed with an open slot, a replaceable nut-engaging member operatively associated with said hub and formed with a slot alignable with the slot in the hub, gripping means co-acting between said body and said hub whereby said hub may be forcibly rotated, said hub and said body each having circumferentially arcuate interfitting axially disposed flanges and grooves formed therein for rotative guiding movement during relative rotation of the hub and body, longitudinally extending abutments on the hub adjacent the outer edges of the slot therein, respectively complementary longitudinally extending abutments on the nut-engaging member adjacent the outer edges of the slot therein, said nut-engaging member and hub being telescopically engaged in operative association thereof with the abutments on the hub engaging respectively complementary abutments on the nut-engaging member to provide driving connection therebetween.

HERBERT L. FISH.

REFERENCES CITED

The following references are of record in the file of this patent:

UNITED STATES PATENTS

| Number | Name | Date |
|---|---|---|
| 700,359 | McFarland | May 20, 1902 |
| 732,055 | Donavan | June 30, 1903 |
| 747,013 | Snyder | Dec. 15, 1903 |
| 784,876 | Offerman | Mar. 14, 1905 |
| 923,942 | Brockway | June 8, 1909 |
| 1,060,185 | Hitt | Apr. 29, 1913 |
| 1,422,121 | Millen | July 11, 1922 |
| 1,578,065 | Bemus et al. | Mar. 23, 1926 |
| 1,698,618 | Bigelow | Jan. 8, 1929 |
| 1,811,666 | Foster | June 23, 1931 |
| 1,815,804 | Siess | July 21, 1931 |
| 1,890,213 | Cameron et al. | Dec. 6, 1932 |
| 2,305,624 | Lange et al. | Dec. 22, 1942 |
| 2,353,901 | Jires | July 18, 1944 |
| 2,376,575 | Cronan | May 22, 1945 |

FOREIGN PATENTS

| Number | Country | Date |
|---|---|---|
| 840,338 | France | Jan. 16, 1939 |